(12) United States Patent
Petrovic et al.

(10) Patent No.: US 8,144,663 B2
(45) Date of Patent: *Mar. 27, 2012

(54) METHOD AND BASE STATION FOR FORWARDING RETRANSMISSION PROTOCOL RELATED DATA

(75) Inventors: Dragan Petrovic, De (DE); Joachim Löhr, Monzastrasse (DE); Eiko Seidel, Monzastrasse (DE)

(73) Assignee: Panasonic Corporation, Osaka (JP)

( * ) Notice: Subject to any disclaimer, the term of this patent is extended or adjusted under 35 U.S.C. 154(b) by 477 days.

This patent is subject to a terminal disclaimer.

(21) Appl. No.: 12/397,907

(22) Filed: Mar. 4, 2009

(65) Prior Publication Data

US 2009/0207810 A1    Aug. 20, 2009

Related U.S. Application Data

(63) Continuation of application No. 10/572,277, filed on Jul. 21, 2006, now Pat. No. 7,508,792.

(30) Foreign Application Priority Data

Sep. 23, 2003   (EP) .................................. 03021464

(51) Int. Cl.
*H04W 36/00* (2009.01)
(52) U.S. Cl. ......... 370/331; 370/401; 455/436; 455/439
(58) Field of Classification Search .................. 370/349, 370/338, 331, 401; 455/436, 439
See application file for complete search history.

(56) References Cited

U.S. PATENT DOCUMENTS

| 2002/0045448 | A1* | 4/2002 | Park et al. ..................... 455/436 |
| 2002/0181437 | A1 | 12/2002 | Ohkubo |
| 2004/0146033 | A1 | 7/2004 | Soderstrom |

FOREIGN PATENT DOCUMENTS

| EP | 1253736 | 10/2002 |
| WO | 0120938 | 3/2001 |
| WO | 02065797 | 8/2002 |

OTHER PUBLICATIONS

PCT International Search Report dated Jun. 22, 2004.
3GPP: ETSI TS 125 308 v5.3.0 (Dec. 2002): Universal Mobile TelecommunicationsSystem (UMTS); UTRA High Speed Downlink Packet Access (HSPDA); Overall description; Stage 2 (3GPP TS 25.308 version 5.3.0 Release 5); XP002236316; pp. 1-31.

(Continued)

*Primary Examiner* — Phuoc Doan
(74) *Attorney, Agent, or Firm* — Dickinson Wright PLLC

(57) ABSTRACT

The present invention relates to a method for controlling a radio cell change of a communication terminal from a first radio cell to a second radio cell, wherein the first and the second radio cell is controlled by at least one base station of a mobile communication system. The present invention further provides a base station and a communication system comprising a plurality of base stations and a communication terminal adapted to execute the control method. To overcome negative impacts of data loss and delay during a cell change procedure the protocol context of a retransmission protocols are transferred from a source base station to a target base station upon an cell change of a communication terminal in issue.

17 Claims, 10 Drawing Sheets

OTHER PUBLICATIONS

3GPP TR 21.905 v6.3.0 (Jun. 2003): 3$^{rd}$ Generation Partnership Project; Technical Specification Group Services and System Aspects; Vocabulary for 3GPP Specifications (Release 6); pp. 1-53.

3GPP TS 25.401 v6.1.0 (Jun. 2003): 3$^{rd}$ Generation Partnership Project; Technical Specification Group Radio Access Network; UTRAN overall description (Release 6); pp. 1-44.

3GPP TSG-RAN WG3 Meeting #36; Tdoc R3-030688; Further clarifications on the presented evolved architecture, Paris, France; May 19-23, 2003; 4 pages.

3GPP TSG-RAN WG3 Meeting #36; Tdoc R3-030688; Further clarifications on the presented evolved architecture, Paris, France; May 19-23, 2003; 4 pages.

W. R. Stevens: "TCP/IP Illustrated," vol. 1, Addison Wesley Longman, Inc.; Reading, Massachusetts; 1994; pp. 275-296.

Y. Yamao, et al.; Radio Access Network Design Concept for the Fourth Generation Mobile Communication System, Wireless Laboratories, NTT Mobile Communications Network, Inc.; Kanagawa, Japan; 2000; pp. 2285-2289.

3GPP TSG-RAN WG3 Meeting #23; Tdoc RP-040023; Feasibility Study on the Evolution of UTRAN Architecture; Phoenix, Arizaona; Mar. 10-12, 2004; 5 pp.

* cited by examiner

METHOD AND BASE STATION FOR FORWARDING RETRANSMISSION PROTOCOL RELATED DATA

This is a continuation of application Ser. No. 10/572,277 (pending) filed Mar. 16, 2006, which is a national stage of PCT/EP2004/004332 filed Apr. 23, 2004, which is based on EP 03021464.7 filed Sep. 23, 2003, the entire contents of each of which are incorporated by reference herein.

The present invention relates to a method for controlling a radio cell change of a communication terminal from a first radio cell to a second radio cell, wherein the first and the second radio cell is controlled by at least one base station of a mobile communication system. The present invention further provides a base station and a communication system comprising a plurality of base stations and a communication terminal adapted to execute the control method.

TECHNICAL BACKGROUND

W-CDMA (Wideband Code Division Multiple Access) is a radio interface for IMT-2000 (International Mobile Communication), which was standardized for use as the $3^{rd}$ generation wireless mobile telecommunication system. It provides a variety of services such as voice services and multimedia mobile communication services in a flexible and efficient way. The standardization bodies in Japan, Europe, USA, and other countries have jointly organized a project called the $3^{rd}$ Generation Partnership Project (3GPP) to produce common radio interface specifications for W-CDMA.

The standardized European version of IMT-2000 is commonly called UMTS (Universal Mobile Telecommunication System). The first release of the specification of UMTS has been published in 1999 (Release 99). In the mean time several improvements to the standard have been standardized by the 3GPP in Release 4 and Release 5 and discussion on further improvements is ongoing under the scope of Release 6.

The dedicated channel (DCH) for downlink and uplink and the downlink shared channel (DSCH) have been defined in Release 99 and Release 4. In the following years, the developers recognized that for providing multimedia services—or data services in general—high speed asymmetric access had to be implemented. In Release 5 the high-speed downlink packet access (HSDPA) was introduced. The new high-speed downlink shared channel (HS-DSCH) provides downlink high-speed access to the user from the UMTS Radio Access Network (RAN) to the communication terminals, called user equipments in the UMTS specifications.

HSDPA is based on techniques such as fast packet scheduling, adaptive modulation and hybrid ARQ (HARQ) to achieve high throughput, reduce delay and achieve high peak data rates.

Hybrid ARQ Schemes

The most common technique for error detection of non-real time services is based on Automatic Repeat reQuest (ARQ) schemes, which are combined with Forward Error Correction (FEC), called Hybrid ARQ. If Cyclic Redundancy Check (CRC) detects an error, the receiver requests the transmitter to send additional bits or a new data packet. From different existing schemes the stop-and-wait (SAW) and selective-repeat (SR) continuous ARQ are most often used in mobile communication.

A data unit will be encoded before transmission. Depending on the hits that are retransmitted three different types of ARQ may be defined.

In HARQ Type I the erroneous data packets received, also called PDUs (Packet Data Unit) are discarded and new copy of that PDU is retransmitted and decoded separately. There is no combining of earlier and later versions of that PDU. Using HARQ Type II the erroneous PDU that needs to be retransmitted is not discarded, but is combined with some incremental redundancy bits provided by the transmitter for subsequent decoding. Retransmitted PDU sometimes have higher coding rates and are combined at the receiver with the stored values. That means that only little redundancy is added in each retransmission.

Finally, HARQ Type III is almost the same packet retransmission scheme as Type II and only differs in that every retransmitted PDU is self-decodable. This implies that the PDU is decodable without the combination with previous PDUs. In case some PDUs are so heavily damaged that almost no information is reusable self decodable packets can be advantageously used.

Packet Scheduling

Packet scheduling is a resource management algorithm used for allocating transmission opportunities and transmission formats to the users' communication terminals (UEs) admitted to a shared medium as a radio channel Packet scheduling methodologies may be generally characterized by the following:

- The scheduling granularity which may be defined as a time period in which data transmissions of the users are scheduled ahead in time. Finer granularities may require higher computational complexity of the respective scheduling algorithms. Typical scheduling granularity for Universal Mobile Telecommunication System (UMTS) High Speed Downlink Packet Access (HSDPA) is equal to 2 ms, the so-called Time Transmission Interval (TTI).
- The serving order which may refer to the order in which the users' communication terminals are served. It is also referred to as the scheduling algorithm. The two typical implementations of the scheduling algorithm are round robin, in which a cyclically uniform allocation of transmission opportunities is provided to the users, and max C/I aiming to maximize the throughput by allowing only those users access to the shared medium that currently have the best instantaneous channel quality.
- The allocation method which may be a set of criteria for allocating transmission formats. In UMTS HSDPA a typical allocation method comprises current channel condition, Quality of Service (QoS) requirements and amount of packets waiting to be transmitted. These criteria are monitored per flow of a particular user i.e. per flow of a particular UE.

UMTS Architecture

The high level R99/4/5 architecture of Universal Mobile Telecommunication System (UMTS) is shown in FIG. 1 (see 3GPP TR 25.401: "UTRAN Overall Description", available from http://www.3gpp.org). The network elements are functionally grouped into the Core Network (CN) 101, the UMTS Terrestrial Radio Access Network (UTRAN) 102 and the User Equipment (UE) 103. The UTRAN 102 is responsible for handling all radio-related functionality, while the CN 101 is responsible for routing calls and data connections to external networks. The interconnections of these network elements are defined by open interfaces (Iu, Uu). It should be noted that UMTS system is modular and it is therefore possible to have several network elements of the same type.

FIG. 2 illustrates the current architecture of UTRAN. A number of Radio Network Controllers (RNCs) 201, 202 are connected to the CN 101. Each RNC 201, 202 controls one or several base stations (Node Bs) 203, 204, 205, 206, which in turn communicate with the UEs. An RNC controlling several base stations is called Controlling RNC (C-RNC) for these base stations. A set of controlled base stations accompanied by their C-RNC is referred to as Radio Network Subsystem (RNS) 207, 208. For each connection between User Equipment and the UTRAN, one RNS is the Serving RNS (S-RNS). It maintains the so-called Iu connection with the Core Network (CN) 101. When required, a Drift RNS (D-RNS) supports the Serving RNS (S-RNS) by providing radio resources. Respective RNCs are called Serving RNC (S-RNC) and Drift RNC (D-RNC). It is also possible and often the case that C-RNC and D-RNC are identical and therefore abbreviations S-RNC or RNC are used.

Evolved UTRAN Architecture

Currently, the feasibility study for UTRAN Architecture Evolution from the current R99/4/5 UMTS architecture is ongoing (see 3GGP TSG RAN WG3: "Feasibility Study on the Evolution of the UTRAN Architecture", available at http://www.3gpp.org). Two general proposals for the evolved architecture (see 3GGP TSG RAN WG3, meeting #36, "Proposed Architecture on UTRAN Evolution", Tdoc R3-030678 and "Further Clarifications on the Presented Evolved Architecture", Tdoc R3-030688, available at http://www.3gpp.org) have emerged. The proposal entitled "Further Clarifications on the Presented Evolved Architecture" will be discussed in the following in reference to FIG. 3.

The RNG (Radio Network Gateway) 301 is used for interworking with the conventional RAN, and to act as a mobility anchor point meaning that once an RNG 401 has been selected for the connection, it is retained for the duration of the call. This includes functions both in control plane and user plane.

On the control plane the RNG 301 acts as a signaling gateway between the evolved RAN and the CN, and the evolved RAN and R99/4/5 UTRAN. It has the following main functions:

Iu signaling gateway, i.e. anchor point for the RANAP (Radio Access Network Application Past) connection, RANAP connection termination, including:

Setup and release of the signaling connections

Discrimination of connectionless messages

Processing of RANAP connectionless messages,

Relay of idle and connected mode paging message to the relevant NodeB+(s),

The RNG takes the CN role in inter NodeB+ relocations,

User plane control and

Iur signaling gateway between NodeB+ 302-305 and R99/4/5 RNC.

Further, the RNG is the user plane access point from the CN or conventional RAN to the evolved RAN. It has the following user plane functions:

User plane traffic switching during relocation,

Relaying GTP (GPRS tunneling protocol on the Iu interface) packets between NodeB+ and SGSN (Serving GPRS Support Node, an element of the CN) and Iur interworking for user plane.

The NodeB+ 302-305 element terminates all the RAN radio protocols (Layer 1—Physical Layer, Layer 2—Medium Access Control and Radio Link Control sub-layers, and Layer 3—Radio Resource Control). NodeB+ 302-305 control plane functions include all the functions related to the control of the connected mode terminals within the evolved RAN. Main functions are:

Control of the UE,

RANAP connection termination,

Processing of RANAP connection oriented protocol messages

Control/termination of the RRC (Radio Resource Control) connection and

Control of the initialization of the relevant user plane connections.

The UE context is removed from the (serving) NodeB+ when the RRC connection is terminated, or when the functionality is relocated to another NodeB+ (serving NodeB+ relocation). Control plane functions include also all the functions for the control and configuration of the resources of the cells of the NodeB+ 302-305, and the allocation of the dedicated resources upon request from the control plane part of the serving NodeB+. The "+" in the term "NodeB+" expresses the enhanced functionality of the base station in comparison to the R99/4/5 specifications.

User plane functions of the NodeB+ 302-305 include the protocol functions of PDCP (Packet Data Convergence Protocol), RLC (Radio Link Control) and MAC (Media Access Control) and Macro Diversity Combining.

Another alternative for an evolved radio access network (RAN) architecture as proposed in "Radio Access Network Design Concept for the Fourth Generation Mobile Communication System" by Y. Yamao et al., Wireless Laboratories, NTT Mobile Communications Inc, is a cluster-cellular RAN structure is shown in FIG. 5. This architecture does not deviate from Rel99/4/5 architecture to such a large extent as the evolved architecture described above in reference to FIG. 3. The evolved architecture shown in FIG. 5 has a horizontal structure and localized handover processing.

The base stations (BSs) are grouped in clusters and there is a so-called cluster-head BS connecting the cluster to the RNC. BSs belonging to the same cluster are mutually connected through wired interfaces thus forming a sort of local area network (horizontal structure). Certain hierarchical differences in BS are introduced: the cluster-head BS is directly interfaced to the RNC and terminates Layer 3 signaling procedures for radio resource handling on multi-cell level.

Macro diversity gain due to handover is obtained by processing inside the cluster (localized handover processing). Most of the Layer 1/2 signaling is kept within a cluster thus reducing the loads on entrance links and RNC signal processing equipment. Each of the base stations may monitor channel quality autonomously and decides on whether it transmits a packet to a particular UE or not. This solution minimizes the probability of unnecessary or excessive transmission power and hence realizes high-efficiency aid low-interference transmission.

HSDPA for UMTS

High Speed Downlink Packet Access (HSDPA) is a new technique that was standardized in UMTS Release 5. It may provide higher data rates in the downlink by introducing enhancements such as adaptive modulation to the Uu interface between a UE and a Node B. HSDPA relies on Hybrid Automatic Repeat reQuest protocol (HARQ) Type II/III, rapid selection of users that are active on the shared channel and adaptation of transmission format parameters according to the time varying channel conditions. The unveiled invention is particularly applicable to HSDPA. Although most of the presented embodiments refer to HSDPA, the invention is not restricted to this system. Therefore the data transmission does not necessarily depend on a particular radio access scheme.

The User Plane Protocol Stack Architecture for HSDPA assuming Rel99/4/5 UTRAN architecture is shown in the FIG. 4. The HARQ protocol and scheduling is a function of the MAC-hs sublayer (MAC=Media Access Control) which is distributed across Node B and UE. An SR ARQ protocol based on sliding window mechanisms may also be established between RNC and UP on the level of Radio Link Control (RLC) sublayer in acknowledged mode. The service that is offered from RLC sublayer for point-to-point connection between core network (CN) and the UE may be also referred to as an Radio Access Bearer (RAB). Each RAB may be subsequently mapped to a service offered from MAC layer. This MAC-layer service may also be referred to as a Logical Channel (LC).

Parameters of the protocols may be configured by signaling in the Control Plane. In UMTS, the signaling between radio network (S-RNC) and UE may be controlled by the Radio Resource Control (RRC) protocol. The signaling among the UTRAN entities may be controlled by application protocols, e.g. the Node B Application Part (NBAP) on the Iub interface between Node B and RNC and the Radio Network Subsystem Application Part (RNSAP) on the Iur interface between RNCs.

The HS-DSCH FP (Nigh Speed Downlink Shared Channel Frame Protocol) is responsible for flow control between Node B and RNC. It determines the capacity that can be granted to ANC for transmitting packets across the transport network based on requests obtained from RNC. More specifically, the capacity is requested by CAPACITY REQUEST messages of HS-DSCH PP originating from S-RNC. The permission for a UE to transmit a certain amount of data over a certain period of time is granted by CAPACITY GRANT messages sent from a Node B.

The format of a HS-DSCH FP data frame is shown in FIG. 6. The explanation of respective field is as follows. The data frame comprises a header, a payload section and a tail.

In the header the Header CRC field provides a Cyclic Redundancy Checksum calculated on the header of a data frame using a polynomial. Further, the header comprises the CmCH-PI (Common Transport Channel Priority Indicator) information element which indicates the priority of the data frame and the corresponding MAC-d PDUs. The CmCH-PI may be in the range 0 to 15, where 0 means lowest priority and 15 is the highest priority. The Frame Type (F) field in the header describes if the present HS-DSCH FP data frame is a control frame or a data frame.

Further, the MA C-d PDU Length indicates the length in form of the number of bits of each MAC-d PDU in the payload of the HS-DSCH FP data frame. The Number of PDUs field Indicates the number of MAC-d PDUs in the payload section. The User Buffer Size field provides the users' buffer size (i.e. the amount of data in the buffer) in octets for a given Common Transport Channel Priority Indicator level.

Finally, the header comprises spare bits as indicated for future use.

In the payload section of a FP data frame comprises the MAC-d PDUs. A MAC-d PDU contains the C/T field of the MAC header followed by a RLC Packet Data Unit (PDU). The C/T field is used for providing an unambiguous identification of logical channels in case several logical channels are multiplexed on the same transport channel. Spare bits before the beginning of each MAC-D PDU in the payload section are also comprised. The payload section may comprise several MAC-d PDUs, wherein the total number of MAC-d PDUs in the payload section is indicated in the header (Number of PDUs).

In the tail section of the FP data frame a Payload CRC provides a Cyclic Redundancy Checksum calculated on the payload of a data frame with a polynomial. The Spare Extension indicates the location where new information elements (UEs) can be added in a backward compatible way for further extensions.

Mobility Management within R99/4/5 UTRAN

In this section some frequently used terms will be briefly defined and some procedures connected to mobility management will be outlined (see 3GPP TR 21.905: "Vocabulary for 3GPP Specifications" available at http://www.3gpp.org).

A radio link may be a logical association between single UE and a single UTRAN access point. Its physical realization comprises radio bearer transmissions.

A handover may be defined as transfer of a user's connection from one radio bearer to another. In contrast, during "soft handover" (SHO) radio links are established and abandoned such that the UE always keeps at least one radio link to the UTRAN. Soft handover is specific for networks employing Code Division Multiple Access (CDMA) technology. Handover execution is commonly controlled by S-RNC in mobile radio network.

The "active set" comprises a set of radio links simultaneously involved in a specific communication service between UE and radio network, e.g. during soft handover, the UE's active set comprises all radio links to the RAN's Node Bs serving the UE.

An Active set update procedure modifies the active set of the communication between UE and UTRAN. The procedure comprises three functions: radio link addition, radio link removal and combined radio link addition and removal. The maximum number of simultaneous radio links is set to eight. New radio links may be added to the active set once the pilot signal strengths of respective base stations exceed certain threshold relative to the pilot signal of the strongest member within active set. A radio link may be removed from the active set once the pilot signal strength of the respective base station exceeds certain threshold relative to the strongest member of the active set. The threshold for radio link addition is typically chosen to be higher than that for the radio link deletion.

Hence, addition and removal events form a hysteresis with respect to pilot signal strengths. Pilot signal measurements are reported to the network (S-RNC) from the UE by means of RRC signaling. Before sending measurement results, some filtering my be performed to average out the fast fading. A typical filtering duration may be about 200 ms and the duration contributes to handover delay. Based on measurement results, S-RNC may decide to trigger the execution of one of the functions of active set update procedure.

Specific Features of R99/415 HSDPA Architecture for Mobility Management

The R99/4/5 HSDPA Architecture is distributed in two different aspects: To the first aspect, entities of retransmission protocols transmitting on the downlink, RLC and MAC-hs, are located in the S-RNC and Node B respectively and, to the second aspect, radio resource management algorithms, handover control and packet scheduling are based on two independent measurements obtained from UE and are located in S-RNC and Node B respectively. These features have certain implications on mobility management and context preservation in HSDPA.

HS-PDSCH (High Speed Physical Downlink Shared channel) is a physical channel associated to HS-DSCH. The frame of the HS-PDSCH (TTI of 2 ms) are short compared to frames of dedicated channels (10 ms) in order to allow fast scheduling and fast link adaptation. Applying soft handover would cause problems in distributing scheduling responsibilities across all Node Bs of the active set and would require extremely tight timing to provide the scheduling decision to all members of the active set even if distribution of scheduling function were resolved. Therefore, soft handover is not supported for HS-PDSCH. Soft handover for A-DPCH is allowed which means it can be transmitted from more than one base station to a UE which combines obtained signals. A handover procedure related to HSDPA radio link is called serving HS-DSCH cell change.

During a serving HS-DSCH cell change procedure as shown in FIG. 7 and FIG. 8, the role of serving RS-DSCH link is transferred from the source radio cell 704 or link to a target radio cell 705. The two cells 704, 705 involved in the procedure are more specifically denoted source HS-DSCH cell and target HS-DSCH cell. The network-controlled serving HS-DSCH cell change is characterized in that the network makes the decision of the target cell. For example in UMTS Release 5, this decision process is carried out in the S-RNC 706.

Cell change procedure may also be initiated by the UE 703. In this case it is referred to as UE-controlled serving HS-DSCH change procedure. Another criterion for categorizing a cell change procedure is the categorization with respect to the serving HS-DSCH Node B.

The Node B 701 controlling the serving HS-DSCH cell 704 for a specific UE 703 is commonly called as the serving HS-DSCH Node B. Intra-Node B serving HS-DSCH cell change procedure is a cell change procedure wherein source and target HS-DSCH cells are controlled by the same Node B. In inter-Node B serving HS-DSCH cell change procedure, source and target HS-DSCH cells are controlled by different Node Bs 701, 702.

Synchronized serving cell change procedures are cell change procedures in which a Node B and a UE can simultaneously start transmitting/receiving signals after handover completion. Synchronization between the UE and the network is maintained with activation timers that are set by RRC entity in S-RNC. Due to unknown delays over Iub/Iur interfaces, processing and protocol delays, a suitable margin is assumed when determining activation timer setting. The margin also contributes to handover delay.

Executing an inter-Node B serving HS-DSCH cell change procedure also implies executing a serving HS-DSCH Node B relocation procedure. During the serving HS-DSCH Node B relocation procedure, a part of the MAC-hs protocol context may be lost.

In FIG. 7, the situation before the actual cell change of the UE 703 is shown. UE 703 communicates via a radio link of the source cell 704 with Node B 701, while RNC 706 decides to assign the source cell 705 of Node B 702. FIG. 8 illustrates the communication of the UE 703 using a new radio link of target cell 705 after having performed the cell change.

Assuming that the one way Iub delay equals 50 ms, the resulting worst case Node B buffer occupancies per user and for a specific service can be calculated (see table below). Depending on a specific flow control algorithm employed on the Tub interface, the Node B buffer occupancy can vary.

| Service | 1.2 Mbps | 3.6 Mbps | 10 Mbps |
|---|---|---|---|
| Mean Node B+ buffer occupancy [byte] | 7500 | 22500 | 62500 |

Apart from handover delays that are specific for all procedures and result from measurement and synchronization delays, there is an additional delay introduced by this data loss. This delay is incurred due to compensation of lost packets.

For interactive services requiring high reliability of data transmission, end-to-end reliable transport protocols such as TCP are used. Compensation of lost packets by means of these protocols causes an additional delay mainly due to retransmitting the packets over core network and radio access network.

This increased delay may trigger spurious timeouts of timers of a reliable transport protocol (TCP) used for end-to-end transmission and may thereby slow down the data rate of packets being input to UTRAN due to congestion control mechanisms. This mechanism is for example described in "TCP/IP Illustrated Volume 1, The Protocols" by W. Richard Stevens, Addison-Wesley, 1994 (ISBN 0-201-63346-9). Assuming a TCP segment size equal to 1500 bytes, the amount of data lost due to the loss of the retransmission protocol's context in the Node B buffers is in the range from 5 to 41 segments. After performing cell change procedure it is probable that channel conditions of the user will be improved. However, due to invoked TCP congestion control a number of packets that are available for scheduling is decreased and radio resources are not utilized efficiently.

SUMMARY OF THE INVENTION

The object of the present invention is to overcome negative impacts of data loss and delay during a cell change procedure.

One aspect of the present invention is a protocol context transfer of a retransmission protocol to the base station which is communicating with a communication terminal after a cell change. By transferring the protocol context before the actual change in the radio link, i.e. of the radio cell, occurs, the new designated base station communicating with the communication terminal may continue to proceed with the data retransmission processes that have been initially started by the previous base station serving the communication terminal. Hence, the delay that is implied due to the loss of this protocol context for a cell change of a communication terminal in a conventional system may be avoided.

The usage of the suggested protocol context transfer among base stations is especially applicable in case the base stations manage the cell change of communication terminals, for example in the evolved UMTS UTRAN architecture. It is noted that the present invention is however not limited to this architecture.

According to an embodiment of present invention a method for controlling a radio cell change of a communication terminal from a first radio cell to a second radio cell, wherein each of the first and the second radio cell is controlled by a base station of a mobile communication system is provided. The method may comprise the steps of deciding in a first base station controlling the first radio cell and being in communication with the communication terminal to assign the communication terminal to the second radio cell, transferring a protocol context of a data retransmission protocol from the first base station to a second base station controlling the second radio cell and assigning the communication terminal to the second radio cell.

Further, according to another embodiment, an activation time, at which the second base station starts transferring data to the communication terminal may be determined, and by transferring the determined activation time from the first base station to the second base station controlling the second radio cell, the designated new base station, i.e. the second base station may be informed at which point of time the cell change of the communication terminal should occur.

The activation time may be transmitted to the second base station using a radio link setup message of an RANSAP+ protocol. The radio link setup message may comprise parameters of retransmission protocol transmitting entities used for setting-up a radio bearer between communication terminal and the second base station after cell change.

It is of further advantage if the communication terminal is also provided with this information. According to another embodiment of the present invention, the method may therefore comprise the step of transmitting the determined activation time to the communication terminal.

The method may further comprise the step of transmitting information relating to the set up of a radio link between the second base station and the communication terminal from the first base station to second base station prior to activation time. By this feature the first base station may provide radio link relevant information to the second base station and may inform the second base station upon a cell change in issue, such that a new radio link may be established from the second base station to the communication terminal.

At least one of the activation time and the information relating to the set up of a radio link may be transmitted to the communication terminal in a radio bearer setup message of a radio resource control protocol.

The method may further comprise the step of the second base station and the communication terminal starting data transmissions in the second radio cell upon reaching the determined activation time.

According to another embodiment of the present invention a shared channel may be employed for downlink data transmissions. Taking the example of UMTS, such a shared downlink channel may be the HS-DSCH of HSDPA. According to a further embodiment of the present invention an enhanced uplink dedicated channels (E-DCH) is employed for uplink data transmission.

In UMTS several sublayers contain data retransmission functionality. E.g. HARQ may employed for data retransmissions on the MAC-hs sublayer while in another sublayer the RLC protocol also provides retransmission capabilities. The method according to a further embodiment may employ a Hybrid ARQ protocol as the data retransmission protocol.

According to another embodiment, the data retransmission protocol may be a radio link control RLC protocol.

As the HARQ and RLC in UMTS supplement each other, i.e. if the HARQ retransmission mechanism fails to reliably transmit a data packet, this will be discovered by the higher layer RI-C protocol, which in turn will initiate a retransmission of the erroneous data. Therefore, according to another embodiment of the present invention, the data retransmission protocol may employ a Hybrid ARQ protocol and a radio link control RLC protocol.

In case of employing HARQ, the protocol context transferred may comprise data packets waiting for initial transmission, data packets pending for retransmission, HARQ process state variables and state of timers of HARQ transmission entities, and physical layer related information such as a redundancy version used for data transmissions of an HARQ process, a constellation used for data transmissions of an HARQ process, an HARQ process number and a New Data Indicator. The HARQ process state variable may comprise the reached number of transmissions for a particular data packet of an HARQ process.

The HARQ protocol context may further comprises parameters of the HARQ transmitting entities, in case the parameters have not been transmitted to the second base station in a radio link setup message. The parameters of the HARQ transmitting entities may comprise at least one of a value of a discard timer and the maximum number of allowed retransmissions for transmission data packets. The indicated state of timers may comprise the values of discard timers for transmission data packets of different HARQ processes.

When the RLC protocol is employed as a data retransmission protocol, the protocol context transferred may comprise data packets waiting for initial transmission, data packets pending for retransmission, control packets pending for transmission, RLC state variables, and the state of timers of the RLC transmission entities. The RLC state variables are at least on of variables VT(DAT) indicating the number of times transmission data packets have been scheduled for transmission and an acknowledge state variable VT(A) indicating the sequence number of the transmission data packet acknowledged last by the communication terminal and the state of timers of the RLC transmission entities comprises the state of the Timer Discard.

The RLC protocol context may further comprise parameters of the RLC transmission entities, in case the parameters have not been transmitted to the second base station in a radio link setup message. The parameters of the RLC transmission entities may comprise at least one of the maximum number of times a transmission data packet is retransmitted MaxDat and a Timer Discard value.

According to another embodiment, the protocol context may further comprise protocol parameters determined according to a quality of service of the data transmission that are used to configure entities of HARQ/RLC retransmission protocols. These parameters may alternatively be transferred in radio link setup message.

As will be explained in more detail in the following, the usage of a frame protocol, such as for example the UMTS specific HS-DSCH Frame Protocol may be suited to transfer the protocol context, as those protocols may be extended to accomplish this new functionality. The method may therefore enable the transfer of the protocol context using a frame protocol.

As stated above, amongst other information, all packets waiting for initial transmission or retransmission in the first base station may be transferred to the second base station in the context transfer. Therefore, it may be of advantage if the header of a frame protocol data packet indicates whether transmission data packets comprised in a payload section of the frame protocol data packet are waiting for initial transmission when transferring transmission data packets from the first base station to the second base station during the protocol context transfer.

According to another embodiment of the present invention, when transferring transmission data packets that are not waiting for initial transmission from the first base station to the second base station during the protocol context transfer, a payload section of a frame protocol data packet may comprise at least one transmission data packet and an information corresponding to at least one transmission data packet indicating the transmitting entity's state.

The information corresponding to at least one transmission data packet may comprise a redundancy version used for data transmissions of a HARQ process and a constellation used for data transmissions of a HARQ process, an HARQ process number, a New Data Indicator, and the number of retransmissions of the corresponding transmission data packet. Hence, provided this information from the first base station, the second base station may advantageously continue the transmission process for the data packet.

The present invention also provides a base station controlling a radio cell change of a communication terminal from a first radio cell to a second radio cell, wherein each of the first and the second radio cell is controlled by a base station of a mobile communication system. The base station may comprise decision means for deciding in a first base station controlling the first radio cell and being in communication with said communication terminal to assign the communication terminal to the second radio cell, and transmission means for transferring a protocol context of a data retransmission protocol from the first base station to a second base station controlling said second radio cell and for transmitting data to the communication terminal and the second base station related to the assignment of the communication terminal to the second radio cell.

The base station may further comprise means adapted to perform the method as described above. Further, according to another embodiment of the present invention a communication system comprising a plurality of base stations and a communication terminal is provided.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION

Figure 5:
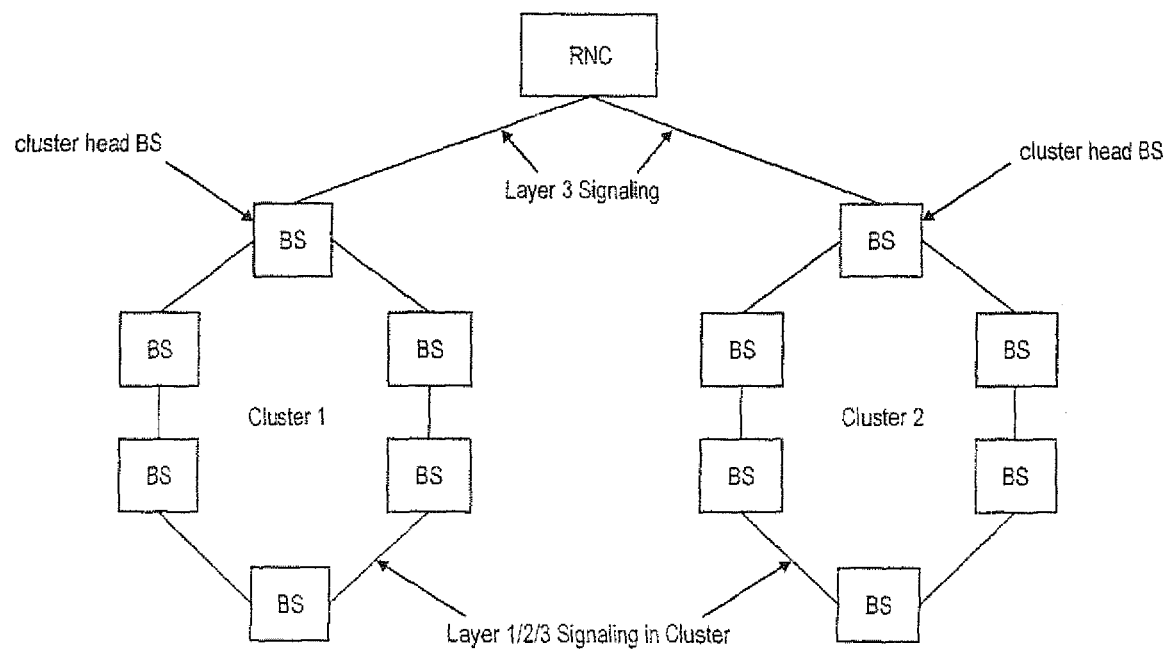
FIG. 5 shows another implementation of an evolved UTRAN architecture.

In the following a detailed description of the various embodiments of the present invention will be given mainly in respect to the evolved UTRAN architectures described earlier as an exemplary radio access network architecture. It is noted that the present invention is not limited to the examples given in the following and to the evolved UTRAN architectures. In the following the term Node BR may also refer to the base stations BS shown in FIG. 5.

Before more closely discussing the protocol context transfer of retransmission protocols upon a cell change of the communication terminal, the changes that may be applied to the HSDPA protocol stack due to employing the evolved UTRAN architecture will be discussed in the following paragraphs.

Figure 9:
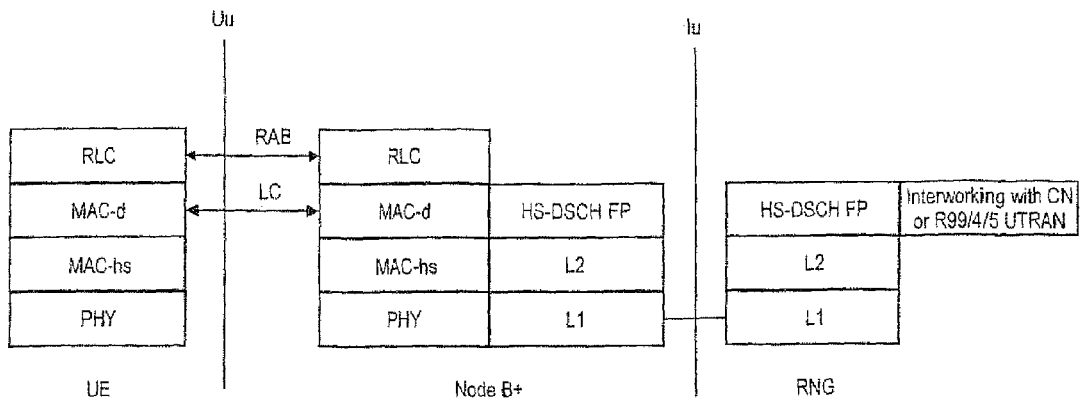
FIG. 9 shows a user plane protocol stack architecture for HSDPA of the evolved UTRAN architecture according to an embodiment of the present invention.

An exemplary user plane protocol stack architecture for HSDPA for the evolved UTRAN architecture is shown in the FIG. 9. All radio interface-specific protocols may be moved to the enhanced Node B+ in order to minimize delay and relax requirements for dimensioning control plane of the transport network. RLC entities may be placed in the same network element (Node B+) with MAC-hs entities. If the transmission is configured over HS-DSCH transport channel, the RLC may operate in acknowledged or unacknowledged mode. In case the RLC is operated in unacknowledged mode, the HARQ retransmission process may be the only data retransmission protocol employed for securing the reliable transmission of data.

Figure 1:
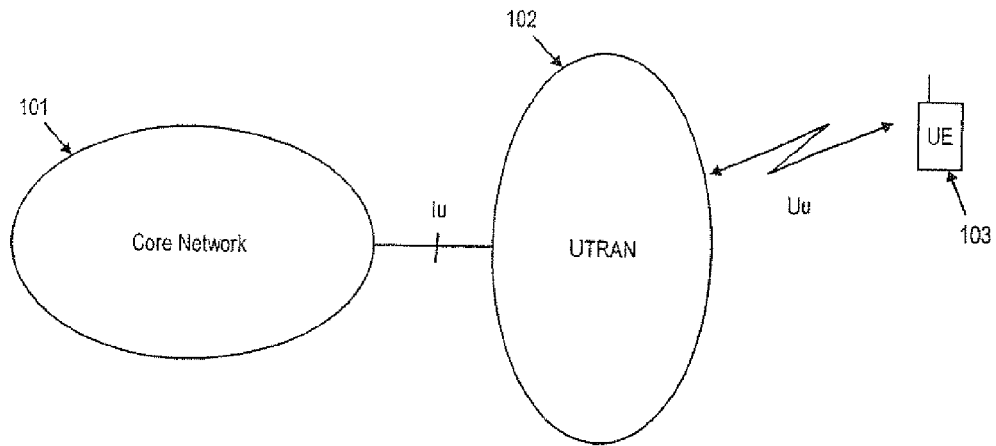
FIG. 1 shows the high-level architecture of UMTS.
Figure 2:
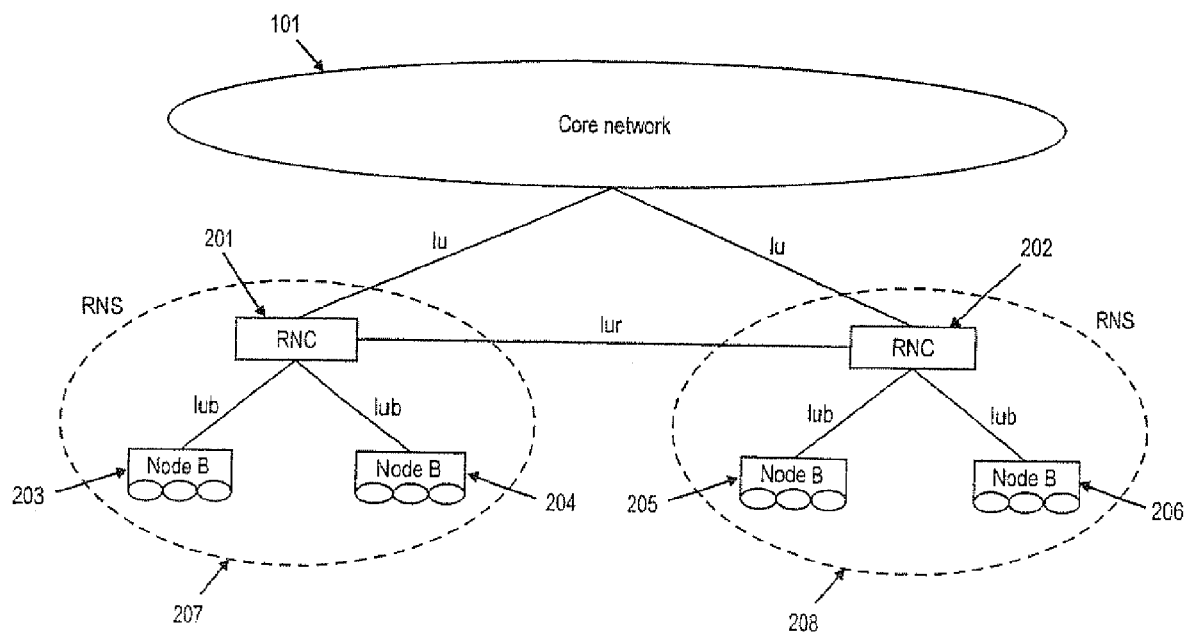
FIG. 2 shows the architecture of the UTRAN according to UMTS R99/4/5.
Figure 3:
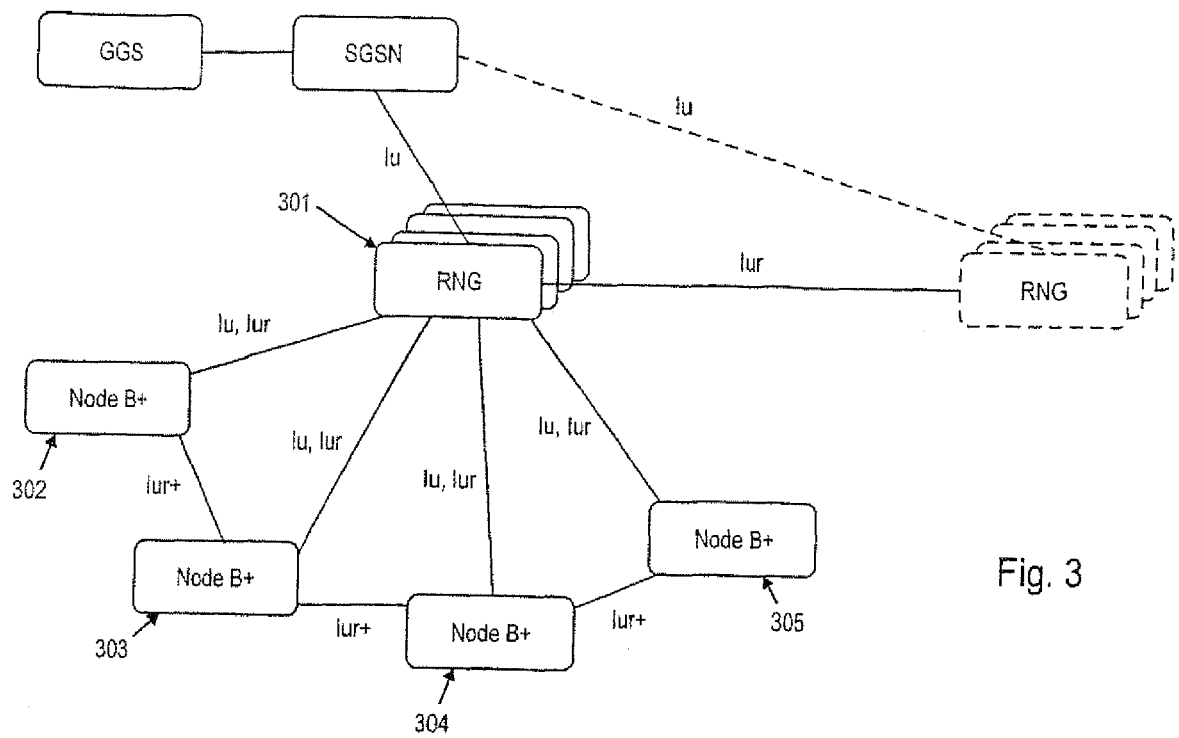
FIG. 3 shows an implementation of an evolved UTRAN architecture.
Figure 4:
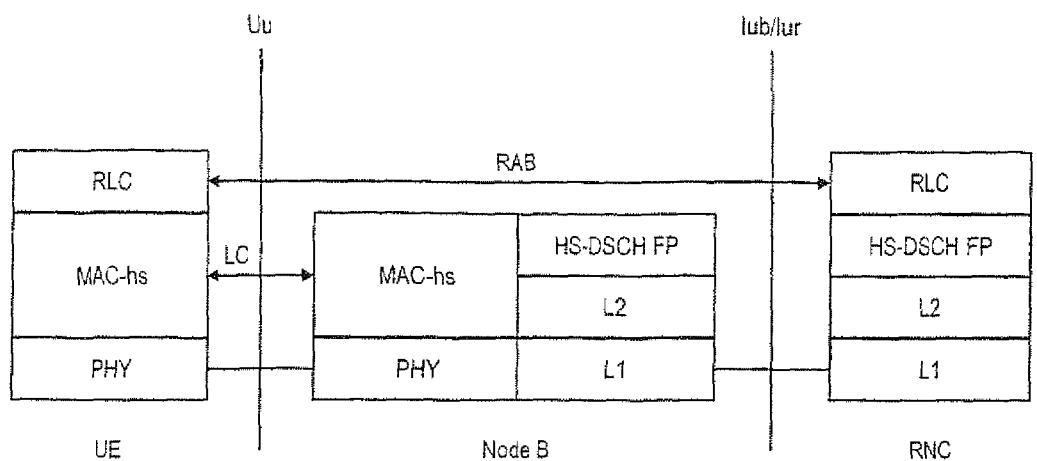
FIG. 4 shows a user plane protocol stack architecture for HSDPA according to the UMTS R99/4/5 UTRAN architecture.

As shown in FIG. 3, the Node BEs may be directly connected by means of the Iur+ interface, while their coupling to the RNC may be established via Iu interfaces. One design criterion for the evolved UTRAN architecture may be to reuse the Iu/Iur interface functionality from Rel99/4/5 to the greatest possible extent and to introduce enhancements only where necessary. One of the various aspects of the present invention is to describe related enhancements.

Figure 10:
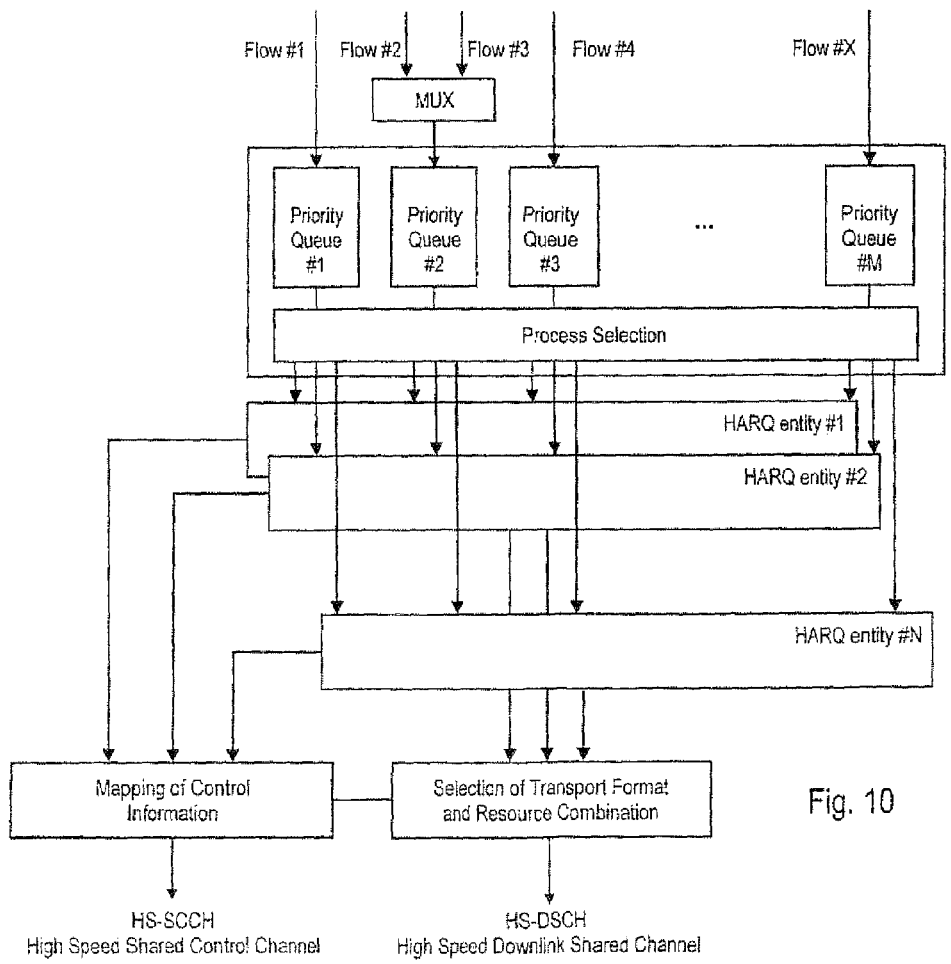
FIG. 10 shows a Node B+ HSDPA architecture according to an embodiment of the present invention.

FIG. 10 shows a functional Node B+ HSDPA architecture of the MAC-hs entities located in the Node B+. The MAC-hs functional architecture may not depend on the underlying UTRAN architecture.

There are X different data flows (logical channels) with transmission data packets to be transmitted from the Node B+ to the User Equipment (UE). The set of HARQ transmitting entities and HARQ receiving entities, located in Node B+ and UE respectively, may be referred to as HARQ processes. The maximum number of HARQ processes per UE may be predefined.

The data flows may have different Quality of Service (QoS) parameters, e.g. delay and error requirements, and may require different configuration of HARQ instances. The scheduler may consider these parameters when allocating resources to different UEs. The scheduling function may control the allocation of a shared channel (HS-DSCH: High Speed Downlink Shared Channel) to different users or to data flows of the same user/communication terminal, the current modulation and coding scheme (MCS) level in one Time Transmission Interval (TTI) and may manage existing HARQ processes for each user.

A data flow or even a particular packet of a data flow may have a different priority. Therefore the Data Packets may be queued in different Priority Queues. Different Data Flows with similar QoS requirements may also be multiplexed together (e.g. Data Flow #3 and #4) using a multiplexer MUX. Besides the High Speed Downlink Shared Channel that carries the data packets there may be control data which may be mapped onto the High Speed Shared Control Channel (HS-SCCH).

This control channel may carry data such as the HARQ process ID, the modulation scheme, code allocation, transport format etc., i.e. information needed by the receiver to correctly receive, demodulate, combine and decode the received transmission data packets.

After having discussed the changes in the HSDPA protocol stack and the HSDPA architecture, it will be now focused on another aspect of the present invention, the cell change procedure of a communication terminal. A cell change of a communication terminal from a source cell to a target cell may be performed in order to switch to a target cell with better radio link quality, to switch to a target cell once the demand for radio resources in the source cell becomes critical (load balancing among radio cells) etc. In order to optimize the time delay between the decision of a base station (Node B+) to assign a UE to another radio cell, an activation time has to be determined.

Taking the evolved UMTS architecture as an example, the activation time may defined as a time instant at which HS-DSCH transmission in the cell controlled by the target Node B+ is started. To avoid or to minimize the loss of HARQ protocol context, the activation time has to be carefully chosen. More generally, the activation time may be defined as the time instant at which the base station controlling the target cell starts transmitting data to the communication terminal.

As has been outlined previously, it may happen that the same base station controls source and target cell which is known as an Intra-Node B cell change in UMTS.

When determining the appropriate activation time for a cell change, the determination process should consider that all transmission data packets (e.g. in form of MAC-hs PDUs) pending for the transmission in the source Node B+ should be successfully transmitted before activation time, if an optimized determination of activation time is not used in conjunction with protocol context transfer (case 1) or that a part of the transmission data packets pending for the transmission in source Node B+ should be successfully transmitted before activation time, if optimized determination of activation time is used in conjunction with protocol context transfer (case 2).

In case 1 and case 2, the scheduling function for HSDPA may consider the value of activation time and eventually speed up the delivery of the packets for the affected user. The flow control function on the Iu/Iur interface (between Node B+ and RNG) may stop receiving the packets for the affected user.

As a dedicated channel, the associated dedicated physical channel (A-DPCH) may be power controlled. Power control commands referring to the A-DPCH obtained from the UE may be for example used as an index for estimating channel quality on the downlink. Another possibility to estimate the channel quality may be to obtain the Channel Quality Indicator (CQI) from uplink signaling. The determination of downlink channel quality information as mentioned above may be of importance for optimizing the determination of the activation time at which a cell change of a communication terminal should be executed.

If the decision on triggering cell change procedure has been made with a significant delay, the channel conditions may change back by the time the procedure is complete. This may result in a continuous ping-pong effect between cells during which it may not be possible to schedule the user.

In order to address this problem according to a further embodiment of the present invention, the difference between the actual activation time $T_A$ and the time instant of making decision $T_D$ on the cell change may exceed the sum of delay of signaling messages $T_{sig}$, delay due to algorithmic complexity $T_{alg}$ of determining activation time and delay due to time necessary for transferring HARQ protocol context $T_{ctr}$, i.e.

$$T_A - T_D \geq T_{sig} + T_{alg} + T_{ctr}. \qquad \text{Equation 1}$$

Figure 7:
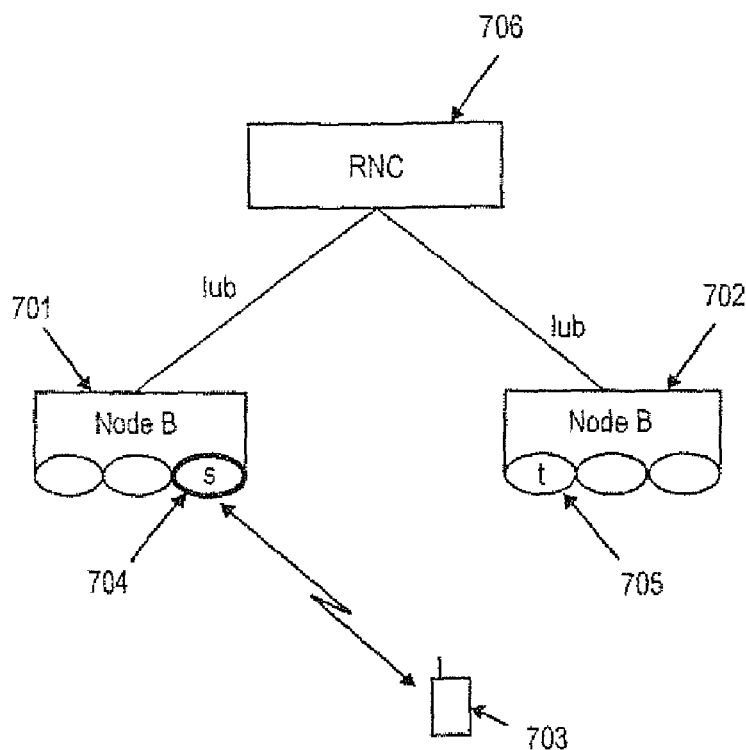
FIG. 7 and FIG. 8 show a serving HS-DSCH cell change procedure.
Figure 8:
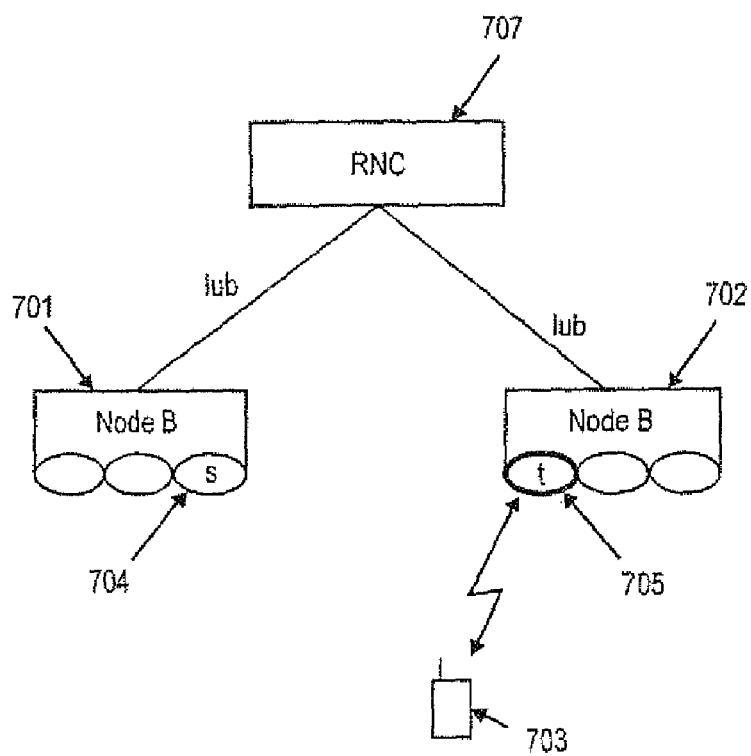
Figure 11:
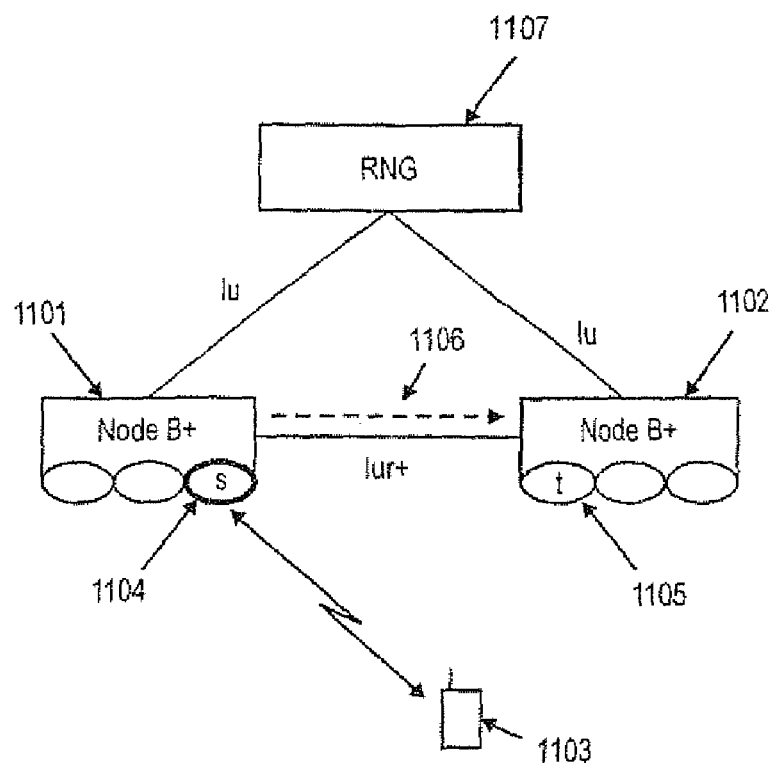
FIG. 11 and FIG. 12 show a serving HS-DSCH cell change procedure according to an embodiment of the present invention.
Figure 12:
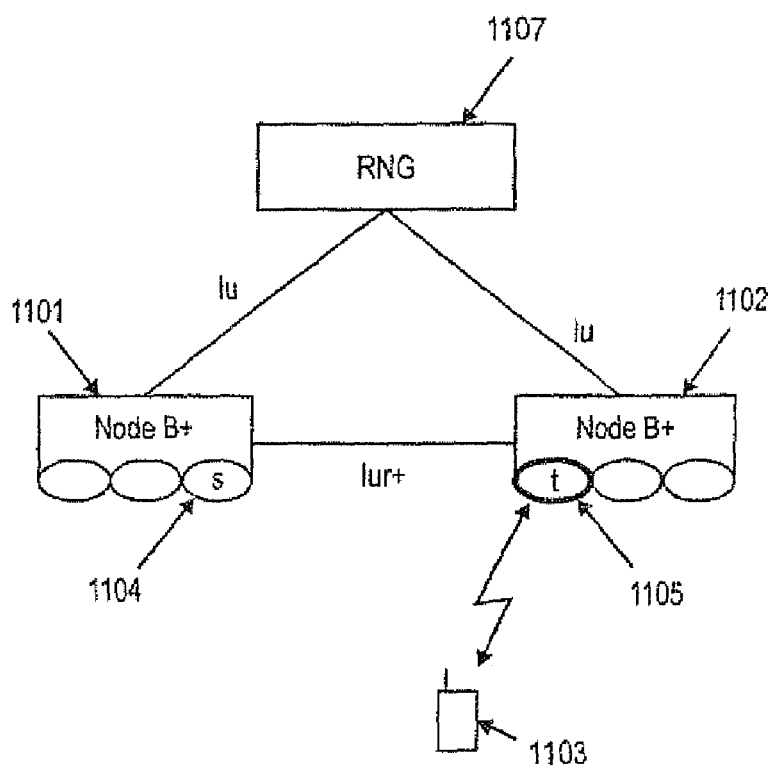

As described in the previous sections, a Node B+ within the exemplary evolved architecture may encompass all user and control plane functions related to radio interface protocol stack. The HS-DSCH cell change procedure for the evolved architecture may be both network-controlled and synchronised. The same terminology from above with the term Node B being replaced by Node B+ is adopted in this specification. It should be noted that the serving HS-DSCH Node B+ relocation procedure may involve relocating HARQ context through the direct wired interface. The serving cell change procedure for Node B+s is depicted in FIG. 11 and FIG. 12. The most important difference with respect to FIG. 7 and FIG. 8 is that enhanced base stations (NodeB+s) may be directly connected through an Iur+ interface and that the RING is connected via an Iu interface to Node B+s. The Iur+ interface implies that RNSAP signalling procedures (control plane) and HS-DSCH FP (user plane) are upgraded to suit the new RAN architecture. Further, the arrow 1106 indicates the context transfer of the retransmission protocol(s) from the source Node B+ 1101 to the target Node B+ 1102 before actually performing a cell change.

The traffic to be served in evolved RAN architecture may consist mainly of non-real time ("IP-based") traffic. Along with the increasing portion of packet data traffic, the percentage of soft handover overhead is expected to decrease, as it is primarily used for efficiently supporting real-time traffic and providing adequate connection quality in the fringe areas of the cells. In European Patent Application No. 02028631.6, "Protocol Context preservation in Mobile Communication Systems" the case of combining the active set update procedure with serving HSDPA cell change decision is discussed. Taking into account that the "IP-based" traffic may dominate the load of future RAN architectures, in this invention it may be considered that soft handover in the new evolved RAN architectures may not be supported and HS-DSCH cell change procedure may be considered as an isolated case.

In the evolved UTRAN architecture, Node B+s may be hierarchically organized. Hence, the current serving Node B+ for HS-DSCH may as well make decision on triggering HS-DSCH cell change procedure. Redesign of the RAN architecture may not affect radio interface related functions and same indices as for Rel99/4/5 architecture may be used as triggers: filtered CPICH measurements, CQI (Channel Quality Indices) reports from UEs or A-DCH power control commands. In case of using filtered CPICH measurements it should be noted that the RRC protocol may be terminated in the Node B+ on the network side (see FIG. 9)

Apart from channel quality indices, radio resource availability (e.g. available power budget in a cell, number of available orthogonal codes in the cell etc.) in potential candidate radio cells may be considered when triggering the decision for a cell change. Additional signaling between Node B+s may result from the decision.

According to a further embodiment of the present invention, a step-wise sequence of events describing a cell change procedure may be implemented as follows;
1. Serving (source) HS-DSCH Node B+ monitors channel quality reports and/or radio resource availability,
2. Serving (source) HS-DSCH Node B+ makes decision on triggering HS-DSCH cell change procedure targeting one of the neighboring cells (Node B+s),
3. Serving (source) Node B+ makes decision on activation time,
4. Serving (source) and target Node B+ exchange signaling messages over Iur+ interface related to HS-DSCH cell change procedure and perform a protocol context transfer and
5. the corresponding UE continues receiving HS-DSCH transmitted by the target Node B+ starting from activation time.

Figure 13:
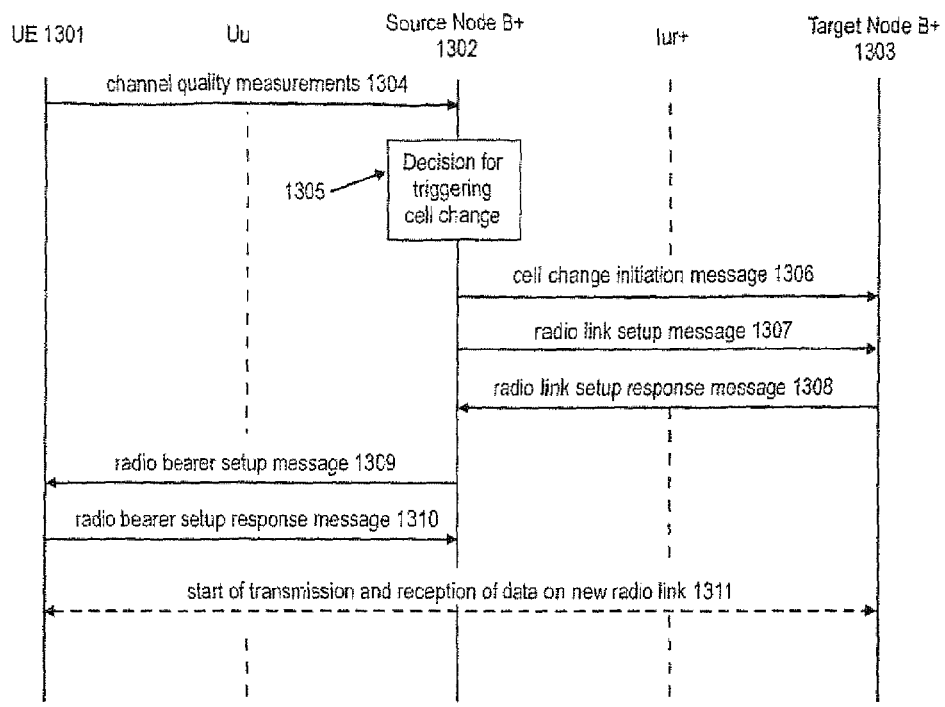
FIG. 13 shows the signaling of an cell change procedure according to a further embodiment of the present invention.

An exemplary signaling procedure for a cell change is depicted in the FIG. 13. In the example, the UE 1301 may transmit a message 1304 indicating the channel quality of radio links between the UE 1301, the source Node B+ 1302 and neighboring cells controlled by other Node B+s. This may e.g. done by transmitting a RRC:MEASUREMENT REPORT message to the serving Node B+ 1302 via RRC signaling.

The serving Node B+ 1302 may determine if a serving HS-DSCH cell change should be performed 1305 based on received measurement reports and radio resource availability.

For the synchronized serving HS-DSCH cell change, both the source Node B+ 1302 and target Node B+ 1303 may first be "prepared" for execution of the handover and the cell change at the activation time: The source Node B+ 1302 may indicate the cell change at issue to the designated target Node B+ 1303 by sending a cell change initiation message 1306 using a signaling protocol, e.g. the RNSAP+ protocol.

A message 1307 for the setup of a radio link to the UE 1301 may be sent by the source Node B+ 1302 to the target Node B+ 1303 using the signaling protocol in order to allow the target Node B+ 1303 to set up a new radio link in the target cell to the UE 1301. Such a message may be a RNSAP+: RADIO LINK SETUP message. This message may comprise the activation time for target Node B+.

Upon having set up the new radio link, the target Node B+ 1303 may confirm the status to the source Node B+ 1302. This may for example be accomplished by sending a further signaling protocol message 1308. In UMTS, a RNSAP+:RADIO LINK SETUP RESPONSE message may be used.

Finally, a radio bearer setup message may be sent 1309 from the source Node B+ 1302 to the UE 1301 to make over-the-air transmission from target Node B+ to the UE possible. Further, the message may inform the UE 1301 about the establishment of the new radio link in the target cell to be used upon the cell change. This message may be a RRC: RADIO BEARER SETUP message transmitted via RRC signaling. The message may also comprise the activation time information and may request for a MAC-hs reset at the UE 1301. MAC-hs reset has to be performed in both UE and source Node B+ in case whole protocol context or a part of it has been lost. When communication on the new radio link is established, the UE 1301 may respond to the source Node B+ 1302 by sending a radio bearer setup response message 1310 such as a RRC:RADIO BEARER SETUP RESPONSE message.

Upon finishing the signaling as outlined above the UP 1301 and the target Node B+ 1303 may start data transmissions 1311 on the established radio link in the target cell.

Executing an inter-Node B+ serving HS-DSCH cell change procedure may also require executing a serving HS-DSCH Node B+ relocation procedure. Here, the problem of HARQ context relocation may arise. If this procedure is limited to flushing the reordering buffer at UE side and transferring all successfully received packets to higher layer, significant performance degradation may occur.

Figure 14:
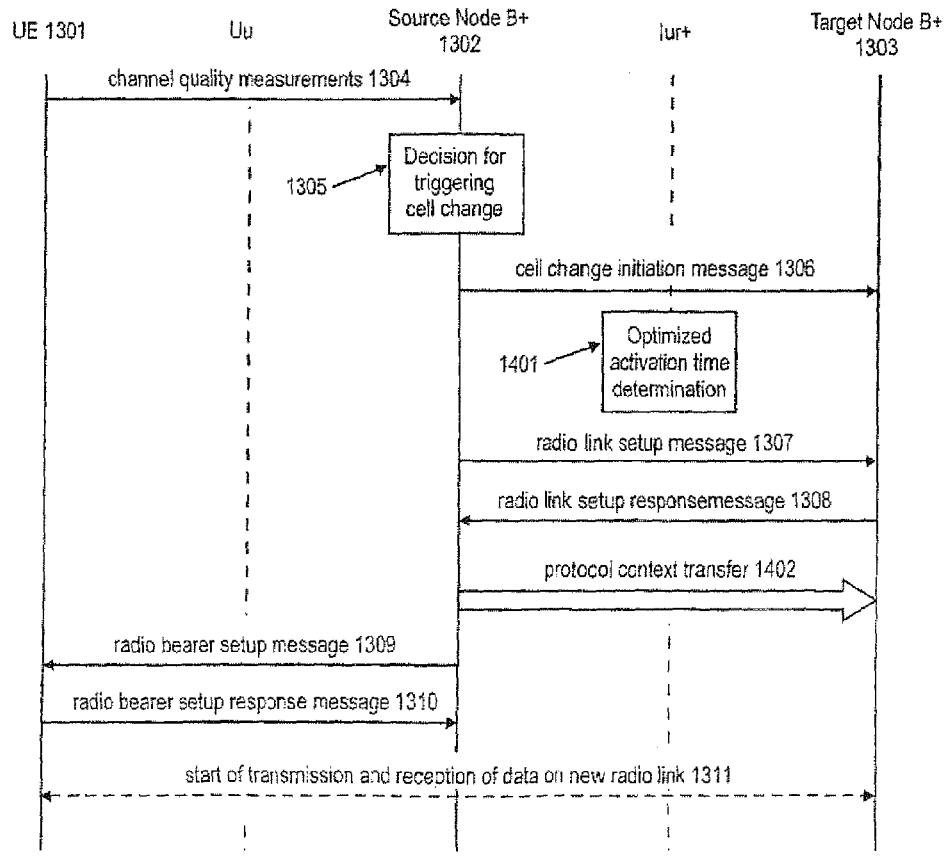
FIG. 14 shows the signaling of an improved cell change procedure according to a further embodiment of the present invention.

A context transfer of the retransmission protocol used for data transmission, such as HARQ, may significantly improve the performance of the system. FIG. 14 illustrates the signaling of an improved cell change procedure according to a further embodiment of the present invention.

According to the signaling procedure of FIG. 14, the UE 1301 may transmit a message 1304 indicating the channel quality of radio links between the UE 1301, the source Node B+ 1302 and neighboring cells controlled by other Node B+s, e.g. a RRC:MEASUREMENT REPORT message to the serving Node B+ 1302 via RRC signaling.

The serving Node B+ 1302 may determine if a serving HS-DSCH cell change should be performed 1305 based on received measurement reports and radio resource availability.

For the synchronized serving HS-DSCH cell change, both the source Node B+ 1302 and target Node B+ 1303 may first be "prepared" for execution of the handover and the cell change at the activation time: The source Node B+ 1302 may indicate the cell change at issue to the designated target Node B+ 1303 by sending a cell change initiation message 1306 using a signaling protocol, e.g. the RNSAP+ protocol.

An optimized determination of the activation time may be performed 1401. The parameters that may be considered in the determination of the activation time have been discussed in the previous paragraphs in detail.

A message 1307 for the setup of a radio link to the UE 1301 may be sent by the source Node B+ 1302 to the target Node B+ 1303 using the signaling protocol in order to allow the target Node B+ 1303 to set up a new radio link in the target cell to the UE 1301. Such a message may be a RNSAP+: RADIO LINK SETUP message. This message may comprise the activation time for target Node B+.

Upon having set up the new radio link, the target Node B+ 1303 may confirm the status to the source Node B+ 1302. This may for example be accomplished by sending a further signaling protocol message 1308. In UMTS, a RNSAP+:RADIO LINK SETUP RESPONSE message may be used.

According to this optimized signaling procedure, the source Node B+ 1302 may transfer the protocol context 1402 of the retransmission protocol(s) (HARQ and/or RLC) to the target Node B+ 1303. This may be accomplished by employing a frame protocol (FP), e.g. the HS-DSCH FP. The paragraphs following the description of FIG. 14, will more closely discuss the transfer of the protocol context using a frame protocol.

Finally, a radio bearer setup message may be sent 1309 from the source Node B+ 1302 to the UE 1301 to make over-the-air transmission from target Node B+ to the UE possible. Further, the message may inform the UE 1301 about the establishment of the new radio link in the target cell to be used upon the cell change. This message may be a RRC: RADIO BEARER SETUP message transmitted via RRC signaling. The message may also comprise the activation time information for the UE 1301. When communication on the new radio link is established, the UE 1301 may respond to the source Node B+ 1302 by sending a radio bearer setup response message 1310 such as a RRC:RADIO BEARER SETUP RESPONSE message.

Upon finishing the signaling as outlined above the UE 1301 and the target Node B+ 1303 may start data transmissions 1311 on the established radio link in the target cell.

Next a further aspect of the present invention related to the protocol context transfer for the employed data retransmission protocol(s) when performing a cell change is discussed in the following.

In case of a cell change of a communication terminal at which the source and the target radio cell are not controlled by the same base station (Node B+) the data retransmission protocol's context is transferred from the source to the target base station. This may be accomplished by transferring the protocol context within the frames of a frame protocol, e.g. the UMTS specific HS-DSCH frame protocol (FP). The data retransmission protocol used may be for example an HARQ protocol and/or a radio link control protocol, e.g. the UMTS specific RLC protocol.

When deciding in a base station to assign a UE to another radio cell controlled by a different base station, a number of transmission data packets may be waiting for their scheduling for the initial transmission to some of the available HARQ processes and also a number of transmission data packets may be pending for retransmissions. Further, the state of HARQ processes may be characterized by whether they are available for accepting packets for initial transmission or whether they still retransmit the pending transmission data packets that may be combined in UE.

The HARQ context or MAC-hs protocol context of a UE may for example comprise:
  Transmission Data Packets waiting for their initial transmission buffered in the Priority Queues of the Node B+,
  Transmission Data Packets waiting for retransmission buffered in respective HARQ transmission entities, and
  State variables (e.g. reached number of transmissions), the state of timers (e.g. the value of the discard timer for the current transmission data packet) and parameters of HARQ transmission entities (e.g. the maximum allowed number of transmissions, the value of the discard timer) as well as physical layer related information.

It should be noted that parameters of HARQ transmission entities may be signaled as a part of radio link setup message 1307 from source to target Node B+.

Figure 17:
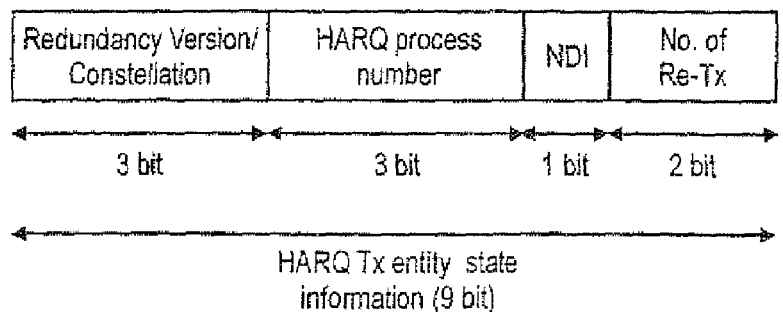
FIG. 17 shows a data format for transmitting state information of the HARQ transmission entities in an information block as shown in FIG. 16 according to an embodiment of the present invention.

Physical layer related information may for example be a Redundancy Version/Constellation used for the downlink transmission to the UE, the HARQ process number, the New Data Indicator indicating the initial transmission of a new transmission data packet. A typical HARQ related state variable may be the number of transmissions for a particular packet that has been reached. Considering the usual maximum number of HARQ transmissions, 2 bits may be sufficient for signaling this variable. Therefore, 9 bits in total may be sufficient for signaling state of HARQ processes, as for signaling the Redundancy Version/Constellation and for the HARQ process number 3 bits respectively may be sufficient, and 1 bit may be spent for signaling the New Data Indicator (see also FIG. 17).

An analogous definition may be applicable for defining the RLC protocol context). The RLC protocol context may for example comprise:
  Data packets waiting for initial transmission,
  Data packets waiting for retransmission,
  Control packets pending for transmission and
  State variables (e.g the number of times a data PDU was scheduled to be transmitted—VT(DAT), the acknowledge state variable containing the sequence number of the last acknowledged packet—VT (A)), the state of timers (e.g. state of Timer Discard) and parameters of RLC transmission entities (e.g. MaxDat maximum number of times a data PDU can be transmitted, Timer Discard value etc.).

It should be noted that parameters of RLC transmission entities may be signaled as a part of radio link setup message 1307 from source to target Node B+.

When transmission data packets waiting for initial transmission are transferred from source to target Node B+, their positions in the queue may have be restored in order to maintain a specific queuing discipline (e.g. FIFO—First In First Out). For the transfer of the packets pending for retransmission, it may be of importance to signal the number of associated HARQ processes to enable subsequent combining in the soft buffer of the UE. The state of each HARQ transmission entities comprises state variables, parameters and timers that may be signaled in the HARQ protocol context transfer.

Further, basic QoS parameters and parameters related to the configuration of HARQ processes may be signaled from the S-RNC to the Node B+ within RNSAP/NBAP information elements (IEs) over Iub/Iur interface. When employing the exemplary evolved UTRAN architecture as shown in FIG. 3 this information may be resent from RNG to the target Node B+ after cell change or the information may be signaled from source Node B+ to target Node B+. In more detail, parameters relating to the QoS of a particular data flow of the RLC and HARQ entities may be transferred from the source Node B+ to the target Node B+ using the radio link setup message (see reference numeral 1307 in FIG. 13 and FIG. 14).

Figure 6:
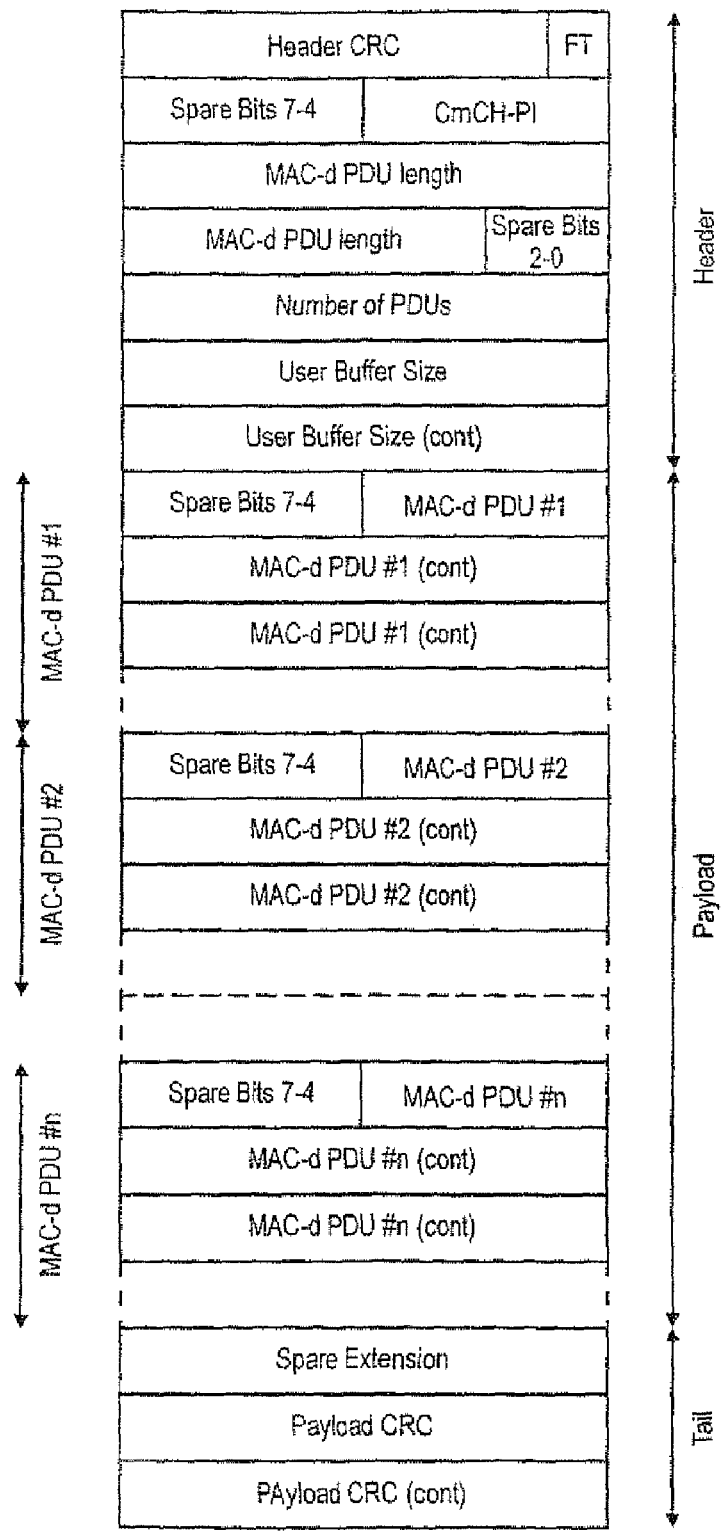
FIG. 6 shows the format of a HS-DSCH FP data frame.
Figure 15:
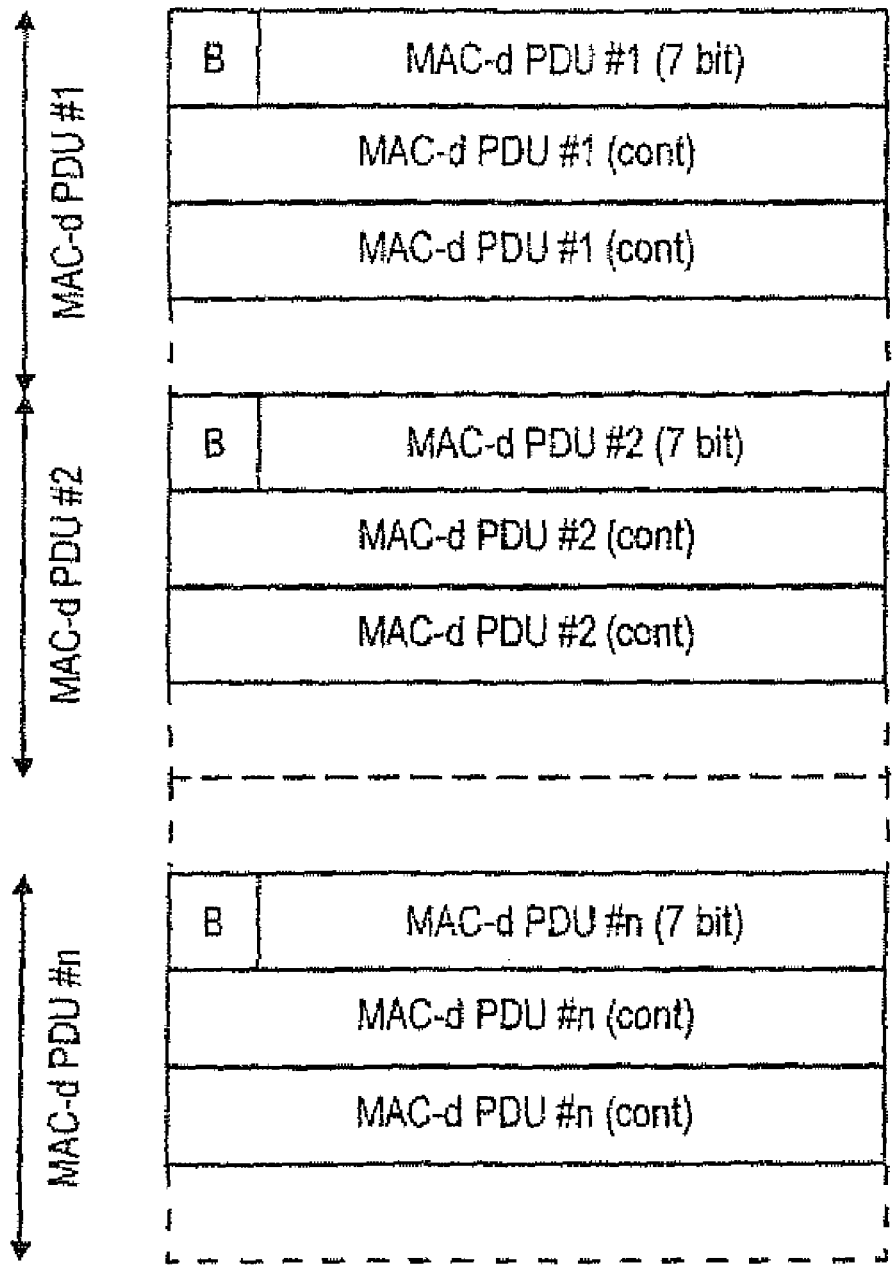
FIG. 15 shows the format of information blocks carrying transmission data packets waiting for initial transmission within a data frame of a frame protocol according to an embodiment of the present invention.

In order to enable the protocol context transfer from the source Node B+ to the target Node B+, a modification of the format of the existing data frames of the HS-DSCH FP may be necessary. The improved formats discussed below with regard to FIG. 15 and FIG. 16 may be embedded in the more general format as shown in FIG. 6. The formats described in the following may be suitable for a MAC-hs context transfer, but straight forward extension to an RLC context transfer is possible.

Packets waiting for initial transmission may be transferred in respective order. The target Node B+ should receive an indication on the type of these packets in "Spare Bits 7-4" field as shown in FIG. 6. As an example the spare bit 0 may be set in order to indicate a retransmission or an initial transmission of a data packet. The table below illustrates the setting of the spare bit 0 in the header of the FP data frame (bit B in the FIG. 15). The bit B may be set to 0 when the packets pending for initial transmission are transferred and it may be set to 1 in other cases. In the former case the format from the FIG. 15 may be used while in the latter case the format from the FIG. 16 may be used.

| Spare bit 7 | |
|---|---|
| Initial transmission | 0 |
| Retransmission | 1 |

Figure 16:
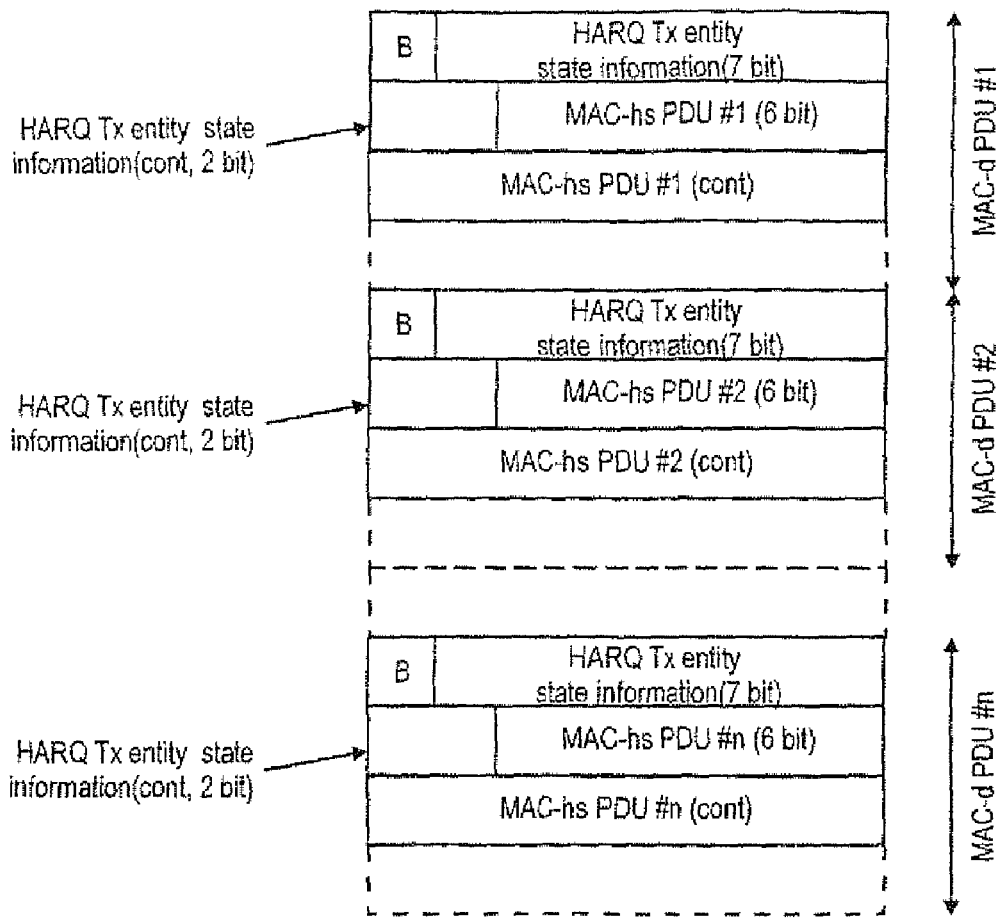
FIG. 16 shows the format of information blocks carrying transmission data packets pending for retransmission within a data frame of a frame protocol according to an embodiment of the present invention.

Packets pending for retransmission may be transferred together with information describing state of respective HARQ processes and their process numbers. An exemplary format of a data frame is shown in FIG. 16. Information tied to the state of HARQ processes may also be transferred from source to target Node B+ within information elements of the RNSAP+protocol, but using the HS-DSCH FP combined with the illustrated data frames seems to provide savings in the signaling delay and overhead and may thus be preferred.

As illustrated in FIG. 16 each information block comprising a transmission data packet pending for retransmission comprises a spare bit. Again, one bit B set to 1 may indicate that the retransmitted packets are not pending for initial transmission. The bits following the spare bits of an information block may comprise the state of the HARQ transmission entities. For example, the redundancy version/constellation used for the transmission of the transmission data packet, the respective HARQ process number, the New Data Indicator and the number of retransmissions of the data packet may be indicated. As suggested in FIG. 17, 9 bits may be used to signal state of the HARQ transmission entities.

The formats for context transfer of RLC, may be defined in almost analogous manner. It should be noted however that in this case two spare bits may be reserved for the field B as packets pending for initial transmission, retransmitted packets and control packets have to be distinguished from each other. Packets pending for initial transmission can be transferred without any additional information while the frames used for transferring retransmitted packets may also transmit the above mentioned state variables and state of the timers.

In another embodiment of the invention, all spare bits 7-4 may be appended to the B field for backwards compatibility reasons. Actual number of bits that is used for signaling of packet type may be the same as explained above.

Above, it has been stated that different indices may be used for triggering a cell change procedure by source Node B+. CPICH measurements may be gathered from multiple Node B+s. E.g. the serving HS-DSCH Node B+ may receive measurements from two Node B+s in immediate neighborhood which may be evaluated. CQI reports and A-DCH power control commands may also be used as indices of deteriorating channel quality of the serving cell.

Finally, it should be noted that the principles and ideas of the present invention are not tied to a specific exemplary RAN architecture, nor to a specific interface enhancement between a communication terminal and a base station such as HSDPA or to enhancement of a specific Iub/Iur signaling protocol (RNSAP+) and respective FP formats.

It has already been noted that any evolved architectures with direct interface between base stations might benefit from the present invention. Further, any radio interface technology requiring design of distributed radio resource management algorithms and retransmission protocol entities across network elements may also benefit from the present invention. The present invention may also be applied on enhanced uplink dedicated channels (E-DCH) and may also involve the distribution of radio resource management algorithms and retransmission protocol entities. Further, it has to be noted that the reference to an enhanced RNSAP protocol and HS-DSCH UP (RNSAP+ and HS-DSCH FP+ respectively) when designing frame formats is exemplary and that the principles described may be applied to any signaling protocol on a wired interface.

Finally it is noted that the present invention may also be applied to the R99/4/5 UTRAN architecture. Performing a cell change in this architecture, the MAC-hs protocol context of the HS-DSCH is lost due to the cell change as described earlier. In this case, the HARQ protocol context may be transferred from the source Node B via the C-RNC to the target Node B which is in line with the principles underlying the present invention as described in the previous paragraphs.

What is claimed is:

1. A method for forwarding retransmission protocol related data upon a radio cell change of a communication terminal from a source radio cell to a target radio cell, wherein each of the source and the target radio cells is controlled by a base station of a mobile communication system, the method comprising:

forwarding, by the base station controlling the source radio cell, data packets of a retransmission protocol that have not been successfully transmitted to the communication terminal by the base station controlling the source radio cell to the base station controlling said target radio cell, and assigning the communication terminal from the source radio cell to the target radio cell, wherein the data packets of the retransmission protocol are forwarded to the base station control ling the target radio cell using a data packet of a frame protocol, wherein a header of a frame protocol data packet indicates whether the respective forwarded data packets comprised in a payload section of said frame protocol data packet are waiting for initial transmission.

2. The method according to claim 1, wherein the data packets of a retransmission protocol that have not been successfully transmitted to the communication terminal are data packets of the retransmission protocol pending for initial transmission and for retransmission at the base station controlling the source radio cell.

3. The method according to claim 1, further comprising:

transmitting the determined activation time from the base station controlling the source radio cell to the base station controlling the target radio cell.

4. The method according to claim 3, further comprising transmitting the determined activation time to the communication terminal.

5. The method according to claim 3, wherein at least one of the activation time and information relating to the set up of a radio bearer is transmitted to the communication terminal in a radio bearer setup message of a radio resource control protocol.

6. The method according to claim 3, further comprising the base station controlling the target radio cell and the communication terminal starting data transmission via the target radio cell upon reaching the determined activation time.

7. The method according to claim 6, wherein the data packets waiting for initial transmission and the data packets pending for retransmission are transmitted to the target base station as part of a protocol context further comprising HARQ process state variables, the state of timers of HARQ transmission entities, and physical layer related information.

8. The method according to claim 1, further comprising transmitting information relating to the set up of a radio link between the base station controlling the source radio cell and the base station controlling the target radio cell, from the base station controlling the source radio cell to base station controlling the target radio cell prior to activation time.

9. The method according to claim 1, wherein the data retransmission protocol is a Hybrid Automatic Repeat Request (HARQ) protocol.

10. The method according to claim 9, wherein the physical channel related information is a redundancy version used for data transmissions of a HARQ process, a constellation used for data transmissions of a HARQ process, a HARQ process number, and a New Data Indicator.

11. The method according to claim 9, wherein the HARQ process state variable comprises the reached number of transmissions for a particular transmission data packet of a HARQ process.

12. The method according to claim 11, wherein the parameters of the HARQ transmitting entities comprise at least one of a value of a discard timer and the maximum number of allowed transmissions for data packets.

13. The method according to claim 9, wherein the protocol context further comprises parameters of the HARQ transmitting entities, in case the parameters have not been transmitted to the base station controlling the target radio cell in a radio link setup message.

14. The method according to claim 9, wherein the state of timers comprises the current values of discard timers for transmission of data packets of different HARQ processes.

15. The method according to claim 14, wherein said information corresponding to at least one transmission data packet comprises a redundancy version used for data transmissions of a Hybrid Automatic Repeat Request (HARQ) process, a constellation used for data transmissions of a HARQ process, an HARQ process number, a New Data Indicator, and the number of retransmissions of the corresponding transmission data packet.

16. The method according to claim 1, wherein when forwarding the data packets that are not waiting for initial transmission from the base station controlling the source radio cell to the base station controlling the target radio cell, a payload section of a frame protocol data packet comprises at least one forwarded data packet indicating the transmitting entity's state.

17. A base station for the forwarding retransmission protocol related data upon a radio cell change of a communication terminal from a source radio cell to a target radio cell, wherein each of the source and target radio cells is controlled by a base station of a mobile communication system, the base station of the source radio comprising:
- a transmission unit configured to forward data packets of a retransmission protocol that have not successfully been transmitted to the communication terminal to the base station controlling said target radio cell and for transmitting data to the communication terminal and the base station controlling the target radio cell related to the assignment of the communication terminal to the target radio cell,
- wherein the transmission unit is further configured to forward the data packets of the retransmission protocol to the base station controlling the target radio cell using a data packet of a frame protocol, and
- wherein the base station is configured to include an indication to the header of a frame protocol data packet indicating whether the respective forwarded data packets comprised in a payload section of said frame protocol data packet are waiting for initial transmission.

* * * * *